F. H. SCHULTZ.
NAILING MACHINE.
APPLICATION FILED APR. 21, 1903.

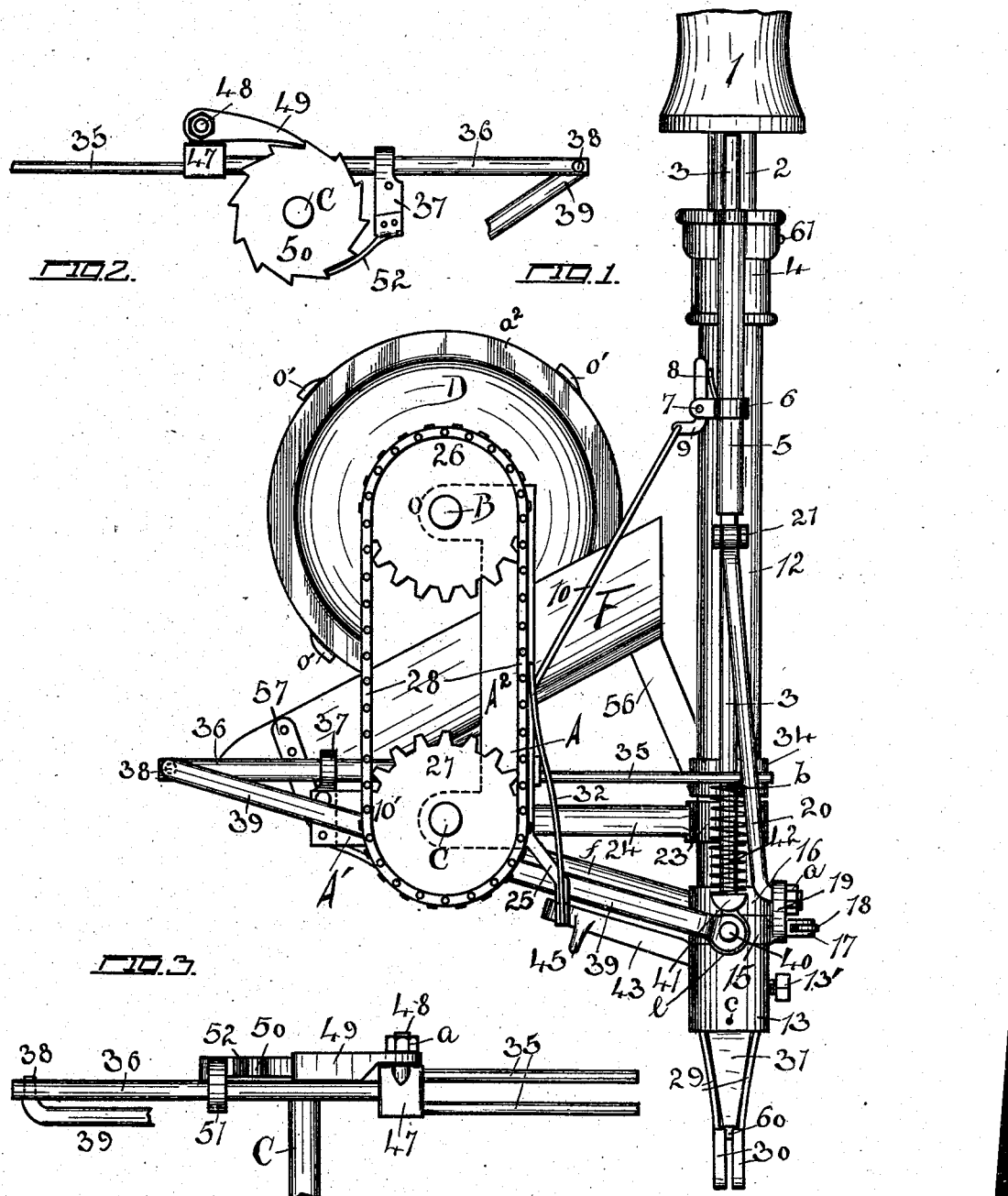

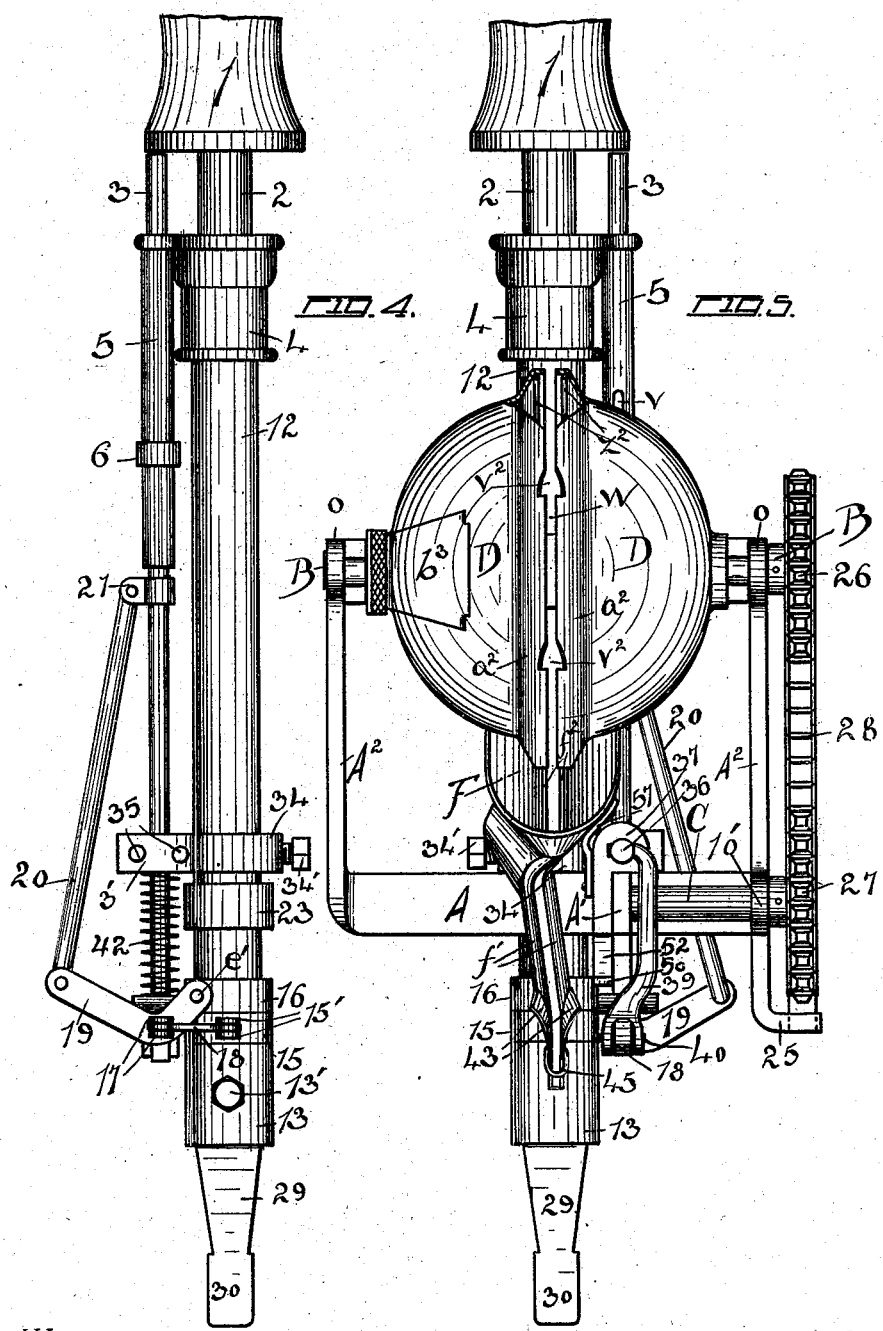

899,767.

Patented Sept. 29, 1908.
3 SHEETS—SHEET 3.

WITNESSES:
T. G. Larson.
Meta Sands.

INVENTOR:
Ferdinand H. Schultz
BY Geo. W. Sues.
Attorney.

UNITED STATES PATENT OFFICE.

FERDINAND H. SCHULTZ, OF TREYNOR, IOWA.

NAILING-MACHINE.

No. 899,767.  Specification of Letters Patent.  Patented Sept. 29, 1908.

Application filed April 21, 1903. Serial No. 153,695.

*To all whom it may concern:*

Be it known that I, FERDINAND H. SCHULTZ, residing at Treynor, in the county of Pottawattamie and State of Iowa, have invented certain useful Improvements in Nailing-Machines; and I do hereby declare that the following is a full, clear, and exact description thereof, such as will enable others skilled in the art to which it appertains to make and use the same, reference being had to the accompanying drawings, which form a part of this specification.

This invention relates to a new and novel improvement in nailing machines.

The object of my invention is to provide a machine, especially adapted to be used by shinglers, so arranged that a suitable magazine may be filled with nails so that the device may be used to pound nails into position, the nails being fed through a suitable chute, extending from the magazine and thence into a holder, from which they are expelled under force by the hammer, and my invention embodies certain other novel arrangements described more fully hereinafter and finally pointed out in the claims.

Figure 6:
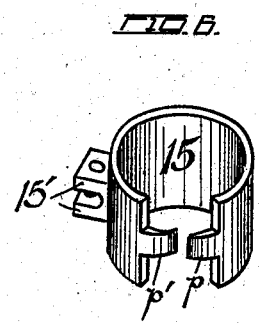
Figure 7:
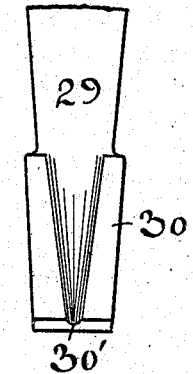

In the accompanying drawings, I have shown in Figure 1, a side view, with portions removed of a nailing machine embodying my invention. Fig. 2, shows a detail of a pawl as used. Fig. 3, shows a top view of said pawl and connected shaft. Fig. 4, shows a detached detail disclosing the arrangement of the striker bar and its connections. Fig. 5, shows a front view of my nailing machine. Fig. 6, discloses a detached detail of the rock-collar, as used in my invention. Fig. 7, discloses a detail of one of the lips 30 as used in my invention, while Fig. 8, discloses a further detail of the pawl used in my device.

In carrying out the aim of my invention, I provide a weighted handle, preferably of metal, from which extends the bar 2, this bar 2, below being provided with a hammer head, 60, as disclosed in Fig. 1. This head 60 is a little smaller than the bar 2. The bar 2 is held within a suitable tube 12, provided above the head 4, below with the terminal collar 13 secured by means of the set screw 13′, and adjacent this is the rock collar 15, above which is held the chute collar 16, and above this again being held the sleeve 23 from which extends the arm 24, holding the bracket A, which extends laterally and upward in the arms $A^2$, as shown in Fig. 5 and terminating in the ears for supporting the shafts C and B. Extending from the lower portion of the bracket A, is the arm A′, which supports the remaining end of the pawl shaft C, as shown in the drawing. Mounted upon the magazine shaft B, is a ball shaped magazine D, provided with suitable feed openings $V^2$, through which the nails are fed.

The magazine is filled through an opening closed by means of a suitable shield $b^3$. The magazine comprises the two counter part magazine members D, so arranged as to provide a circumferential slot W, shown in Fig. 5, which is provided with enlargements $V^2$ at suitable points which are skirted by means of a wire reinforcement $z^2$ forming a crib, the enlargements being made in bending out portions of these magazine members D, as shown at $v^2$, in Fig. 1. These members D are dished outward near the edges to form the circumferential lips $a^2$, as shown in Figs. 1 and 5. The nails are fed haphazard into this magazine and as this magazine revolves, the points of the nails gravitate through the slot $w$, the heads however being engaged between the channel formed by the wire $z^2$ and the lips $a^2$, of this magazine, until they encounter one of the enlargements $v^2$, so that they drop out of the magazine channel into the slotted V shaped chute F positioned below the magazine, which chute upon the rear, is supported by the bar 56 secured to the collar 34, fixed to the tube 12 by means of the set screw 34′, as shown in Fig. 4. The forward end of this chute as shown in Fig. 5 is supported by means of the bar 57, fixed to the arm A′, in this manner. Extending from this chute F, are two guide lips $f′$, shown in Fig. 5, which communicate with and form a continuation in the lips $f^2$, forming part of the magazine mechanism, as shown in Fig. 5. Below, this magazine tube F is secured to the chute collar 16. The shingle nails gravitate down the chutes F and $f$, point downward engaging the guide lips $f′$.

The lower ends of the nails as they feed out one by one are held within the slotted magazine tube F, in a column, the head of one nail being adjacent the head of the preceding nail, and in order that the pendent nails may be properly fed into the terminal collar 13, I provide the guide shields 43, secured in front with the yoke 45.

Interposed between the terminal collar 13 and the chute collar 16, is the rock collar 15, shown in Fig. 6 provided with projecting lips $p$, $p'$, and these lips normally close the passage or slot by means of which the nails are permitted to enter the tube 13. The nail enters the tube through the slot within the collar 16, shown in Fig. 5 through a slot within the rock collar 15 and a slot within the terminal collar 13.
The terminal collar may be removed from the supporting tube 12, by releasing the set screw 13'. In rock collar 15 is swiveled a member provided with ears 15' between which is pivotally mounted one end of a link 18, the other end of said link being pivotally connected to ears 17 formed on a stud swiveled in the bell crank lever 19. Said bell crank is pivoted at one end to the pin $e'$ on collar 16, the other end thereof being secured to a connecting rod 20, which extends upward and is secured to an ear 21, fixed to the striker bar 3, which projects upward beyond the collar 4, secured to the supporting tube 12, as is shown in the drawings. This striker passes through the tube 5, forming a portion of the collar 4, as shown.

A spring 42 encircling striker bar 3 tends to hold the latter normally elevated, one end of said spring bearing upon a knob 41 through which said bar passes, the other end of the spring acting on a pin $b$ carried by said striker bar. The action of spring 42 also tends to hold lips $p$, $p'$ of collar 15 normally closed to prevent passage of nails. A crank arm 39 is pivotally connected at 40 to the lower end of striker arm 3, the upper end of said arm 39 being bent to form a pin 38 which is connected to the transversely and slidably held pawl bar 36, a detail of which is shown in Figs. 2 and 3, and this pawl bar is provided with the two guiding stems 35 working through an ear 3' shown in Fig. 4 and projecting from the collar 34, supporting these guide bars at the rear end, while at the forward end, the enlarged stem 36, of this pawl bar, as shown in Fig. 5, is held within the ear 37, secured to the bracket A'. Secured to this pawl bar 36, is a lug 47, shown in Fig. 3, from which extends a pin 48, supporting the pawl 49, shown in Figs. 2 and 3, normally in engagement with the ratchet 50, mounted upon the shaft C, as shown. In order to properly hold this ratchet 50, I use the spring 52, secured to the collar 37, as shown in Fig. 5, fixed to the bracket projections A'. Mounted upon this pawl shaft C, is a pinion 27, shown in Fig. 1, over which passes a chain 28, working over the pinion 26 mounted upon the magazine shaft B, as shown. To prevent these shafts B and C from revolving, except when directly actuated, I provide the spring 32, secured to an ear 25, fixed to the bracket A, so that this chain 28, can only revolve against the tension of this spring 32.

Figure 8:
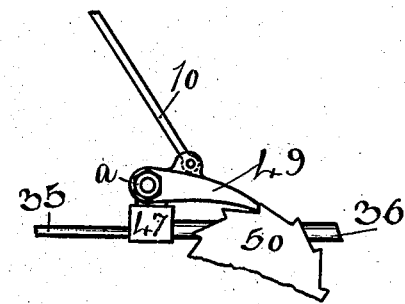

Secured to the pawl 49 is a rod 10, shown in Fig. 8, in turn secured to the lever 9, shown in Fig. 1, held by the pin 7, of the collar 6, the spring 8, normally forcing the lever 9 outward. Now, whenever it is desired to throw the pawl 49 out of engagement with the ratchet wheel 50, the operator simply actuates the lever 9.

In order to prevent the bar 2 from sliding out of the supporting tube 12, I provide the screw 61, within the collar 4, which works against the head or hammer 60, and so prevents the withdrawal of the hammer until the screw 61, is removed.

Secured below the collar 13, shown in Fig. 1, are the two side springs 31, between which and the springs 29 are held the nails passing through the supporting tube 12, these springs 29 below being provided with the lips 30, shown in Fig. 7, which support the instrument while being used, and which are made to spread outward as the nails pass out of the apparatus in a vertical position. These nailing machines are made of suitable sizes and when the instrumentalities have been properly constructed and arranged, the operation of my device is as follows: The operator first revolves the magazine by hand, which can be readily done, so that a suitable number of nails gravitate point forward through the machine. Then as the nails slide through the openings $V^2$, a number of them drop point foremost into the slotted chute F and slide into the slotted magazine tube $f$, being guided by the lips $f^2$ and shields 43, until the first or foremost nail encounters one of the lips upon the rock collar 15 checking its entry into the supporting tube. The operator then raises the handle 1, a suitable distance and drives the same downward so that the hammer comes flush with the lower ends of the lips 30. At the first stroke no nail was held between the springs 29 and 31, as the hammer strikes the bar 3, however, this bar is depressed, lowering the same against the tension of the spring 42, to carry downward the crank arm 39, which resulted in carrying backward the pawl 49, upon the ratchet 50 and connected to the shaft C. The lower end of the connecting bar 20 described as secured to the bell crank 19 resulted in rocking that crank, this rocking movement by reason of the swiveled connections of link 18 is imparted to the rock collar 15, so that the lips $p$ which had checked the entry of the nail, permit the nail to enter the slot, and as the hammer is raised, the nail promptly shoots down, being held between the springs 29 and 31. The operator then again raises the hammer and promptly drives the same downward to force the nail from between the jaws through the shingles. Upon the second stroke, the rock collar is, of course, again operated to permit the entry of the subsequent nails.
Now it occasionally happens that the nails feed forward too fast and so in order to prevent the nails from being fed forward under force, by means of the pawl shaft C, the operator may throw out of working order, the magazine in depressing the lever 9, to raise the pawl 49.

And now having thus described my said invention, that which I claim as new and desire to secure by the U. S. Letters-Patent is:

1. In a nailing machine, the combination of a slotted supporting tube, a slotted terminal collar located at the lower end thereof, a plurality of sets of spring fingers secured to said collar, one set of said fingers being provided with channeled lips, a slotted rock collar located above said terminal collar and provided with a lip normally closing the slot in said tube, a nail magazine, a hammer located in said tube and provided with a weighted handle, and means controlled by said handle for operating said magazine.

2. The combination in a nailing machine, of a feed mechanism, comprising a hollow supporting stem, a rock collar secured to said supporting stem, a pivoted crank suitably supported, and secured to said rock-collar, a bar normally forced in one direction, extending from said crank, a magazine, a chute communicating with said magazine and leading to said rock collar and a handle to strike said bar secured to said rock-collar.

3. In a nailing machine, the combination with a suitably supported drum having a feed opening and a circumferential slot, said slot being provided with enlargements, and ribs positioned adjacent said circumferential slot.

4. In a nailing machine, the combination with a rotatable drum having a feed opening and a circumferential slot, said slot being provided with spaced apart enlargements, and wires secured adjacent the edges of said slots to strengthen said edges.

5. In a nailing machine, the combination with a rotatable drum provided with a peripheral enlargement having a slot therein, said slot being provided with spaced apart enlargements, and means for reinforcing the edges of said slots.

6. In a nailing machine, the combination with a rotatable drum provided with a peripheral enlargement having a slot therein, said slot being provided with spaced apart enlargements, means for reinforcing the edges of said slot, a guide chute to receive the nails discharged from said drum, and means for successively driving said nails and simultaneously imparting a step by step rotation to said drum.

7. In a nailing machine, the combination of a magazine, a chute to receive nails therefrom, a collar provided with means for interrupting the passage of nails through said chute, and means for successively driving the nails and operating said magazine, and simultaneously oscillating said collar to remove the chute interrupting means.

8. In a nailing machine, the combination of a magazine, a chute to receive nails therefrom, a collar provided with lugs to interrupt the passage of nails through said chute, and means for successively driving the nails and operating said magazine, and also simultaneously oscillating said collar, whereby said lugs will permit the passage of a nail through said chute.

In testimony whereof I affix my signature in presence of two witnesses.

FERDINAND H. SCHULTZ.

Witnesses:
O. O. BUCK,
FRED. HOLST.